US010006354B2

(12) United States Patent
Kindl et al.

(10) Patent No.: US 10,006,354 B2
(45) Date of Patent: Jun. 26, 2018

(54) SYSTEM AND METHOD FOR VARIABLE TONGUE SPACING IN A MULTI-CHANNEL TURBINE IN A CHARGED INTERNAL COMBUSTION ENGINE

(71) Applicant: Ford Global Technologies, LLC, Dearborn, MI (US)

(72) Inventors: Helmut Matthias Kindl, Aachen (DE); Norbert Andreas Schorn, Aachen (DE); Vanco Smiljanovski, Bedburg (DE); Franz Arnd Sommerhoff, Aachen (DE); Andreas Kuske, Geulle (NL); Joerg Kemmerling, Monschau (DE)

(73) Assignee: Ford Global Technologies, LLC, Dearborn, MI (US)

( * ) Notice: Subject to any disclaimer, the term of this patent is extended or adjusted under 35 U.S.C. 154(b) by 830 days.

(21) Appl. No.: 14/326,382

(22) Filed: Jul. 8, 2014

(65) Prior Publication Data
US 2015/0013330 A1  Jan. 15, 2015

(30) Foreign Application Priority Data

Jul. 9, 2013 (DE) .................. 10 2013 213 450

(51) Int. Cl.
*F02B 37/24* (2006.01)
*F02B 37/02* (2006.01)
(Continued)

(52) U.S. Cl.
CPC .............. *F02B 37/24* (2013.01); *F01D 9/026* (2013.01); *F02B 37/025* (2013.01); *F02B 37/22* (2013.01);
(Continued)

(58) Field of Classification Search
CPC ........ F02B 37/24; F02B 37/22; F02B 37/025; F01D 9/026; Y02T 10/144; F05D 2220/40
(Continued)

(56) References Cited

U.S. PATENT DOCUMENTS 3,071,347 A  *  1/1963  Schinnerer ............ F01D 17/143
                                                    137/601.04
3,423,926 A        1/1969  Nancarrow et al.
(Continued)

FOREIGN PATENT DOCUMENTS

CN        101473117 A        7/2009
CN        102080577 A        6/2011
(Continued)

OTHER PUBLICATIONS

State Intellectual Property Office of the People's Republic of China, Office Action Issued in Application No. 201410324044.X, dated Nov. 16, 2017, 10 pages. (Submitted with Partial Translation).

*Primary Examiner* — Jason T Newton
(74) *Attorney, Agent, or Firm* — Julia Voutyras; McCoy Russell LLP

(57) ABSTRACT

An internal combustion engine comprising a dual flow turbocharger includes an annular support with at least one tongue-like end wherein the annular support is adjustable in a translational fashion along the turbines axis of rotation. Moving the annular support influences the degree of separation behavior of turbine channels by varying a tongue spacing to the rotor.

10 Claims, 6 Drawing Sheets

(51) Int. Cl.
*F01D 9/02* (2006.01)
*F02B 37/22* (2006.01)

(52) U.S. Cl.
CPC ......... *F05D 2220/40* (2013.01); *Y02T 10/144* (2013.01)

(58) Field of Classification Search
USPC .......................................................... 60/602
See application file for complete search history.

(56) References Cited

U.S. PATENT DOCUMENTS

| | | | |
|---|---|---|---|
| 3,557,549 A | 1/1971 | Webster | |
| 4,776,168 A * | 10/1988 | Woollenweber | F01D 17/141 60/602 |
| 5,214,920 A * | 6/1993 | Leavesley | F01D 17/143 415/157 |
| 5,267,829 A * | 12/1993 | Schmidt | F01D 17/167 415/157 |
| 5,855,117 A * | 1/1999 | Sumser | F01D 17/143 415/158 |
| 6,216,459 B1 * | 4/2001 | Daudel | F02B 37/025 60/602 |
| 6,443,696 B1 * | 9/2002 | Erdmann | F01D 17/143 415/150 |
| 6,672,061 B2 * | 1/2004 | Schmid | F02B 37/02 123/568.17 |
| 6,715,288 B1 * | 4/2004 | Engels | F01D 17/143 415/158 |
| 6,726,447 B2 * | 4/2004 | Lutz | F01D 17/143 415/158 |
| 7,047,739 B2 | 5/2006 | Fledersbacher et al. | |
| 7,186,076 B2 * | 3/2007 | Doring | F01D 17/167 415/158 |
| 7,272,929 B2 * | 9/2007 | Leavesley | F01D 17/167 415/158 |
| 8,250,760 B2 * | 8/2012 | Petitjean | F01D 17/141 29/527.6 |
| 8,293,451 B2 | 10/2012 | Glodde et al. | |
| 8,840,365 B2 * | 9/2014 | Ervin | F04D 25/024 415/131 |
| 9,021,803 B2 * | 5/2015 | Hirth | F01D 17/141 415/158 |
| 9,163,524 B2 * | 10/2015 | Moore | F01D 17/143 |
| 9,234,456 B2 * | 1/2016 | Parker | F02B 37/22 |
| 9,291,092 B2 * | 3/2016 | Sumser | F01D 17/105 |
| 9,488,133 B2 * | 11/2016 | Kierat | F02B 37/22 |
| 9,835,043 B2 * | 12/2017 | Kantany | F01D 17/145 |
| 2003/0123977 A1 * | 7/2003 | Bertnik | F01D 5/28 415/158 |
| 2007/0227603 A1 * | 10/2007 | Perrin | F01D 17/143 138/43 |
| 2010/0310365 A1 * | 12/2010 | Matsuyama | F01D 11/005 415/212.1 |

FOREIGN PATENT DOCUMENTS

| | | | | |
|---|---|---|---|---|
| CN | 102619617 A | | 8/2012 | |
| DE | 4232400 C1 * | | 8/1993 | .......... F01D 17/167 |
| DE | 10028733 A1 * | | 12/2001 | ................ F02C 6/12 |
| DE | 102008039085 A1 * | | 2/2010 | .......... F02B 37/025 |
| DE | 102009012131 A1 * | | 9/2010 | .......... F01D 17/141 |
| GB | 2349179 A | | 10/2000 | |
| WO | 2012107064 A1 | | 8/2012 | |

* cited by examiner

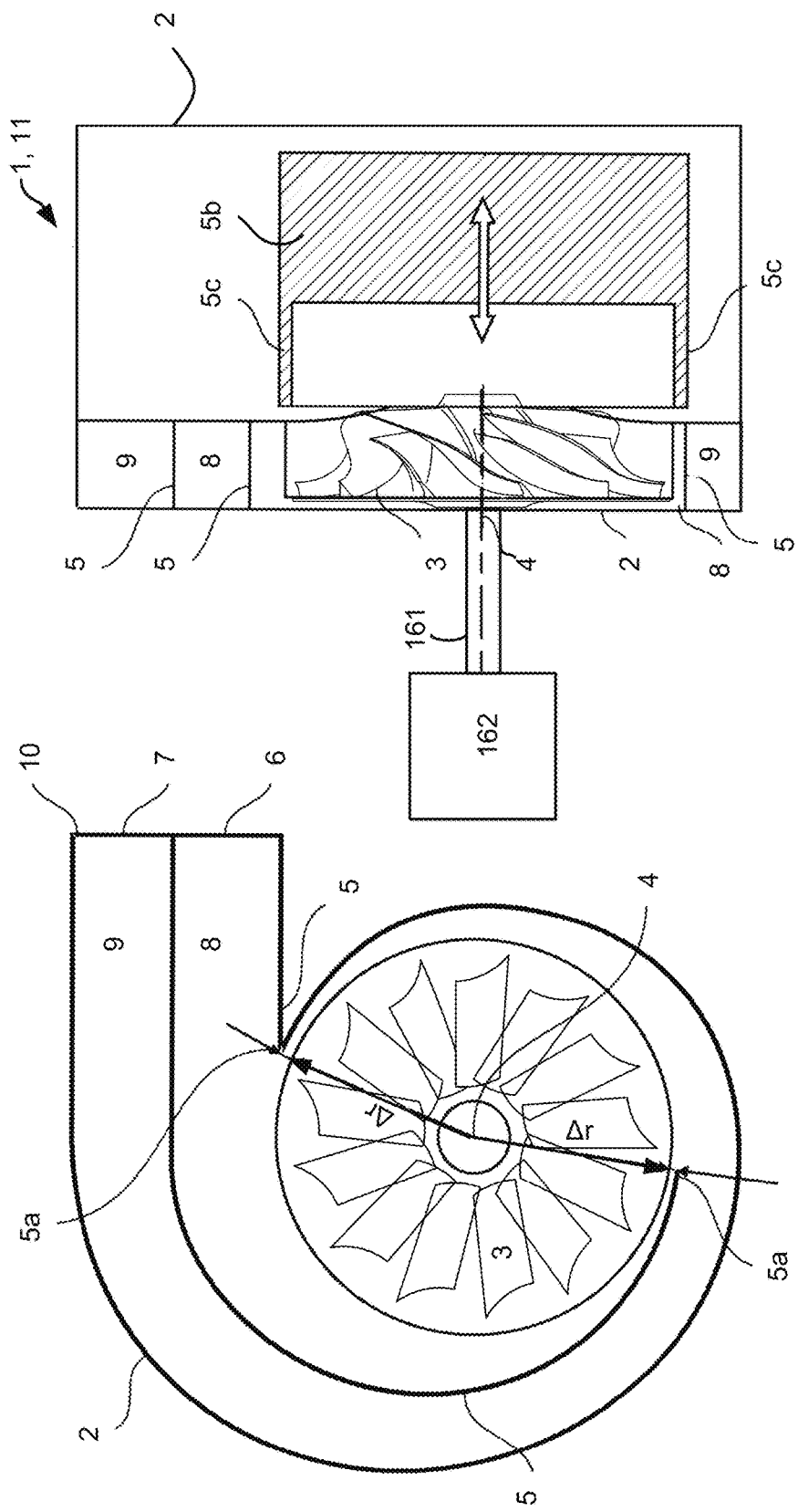

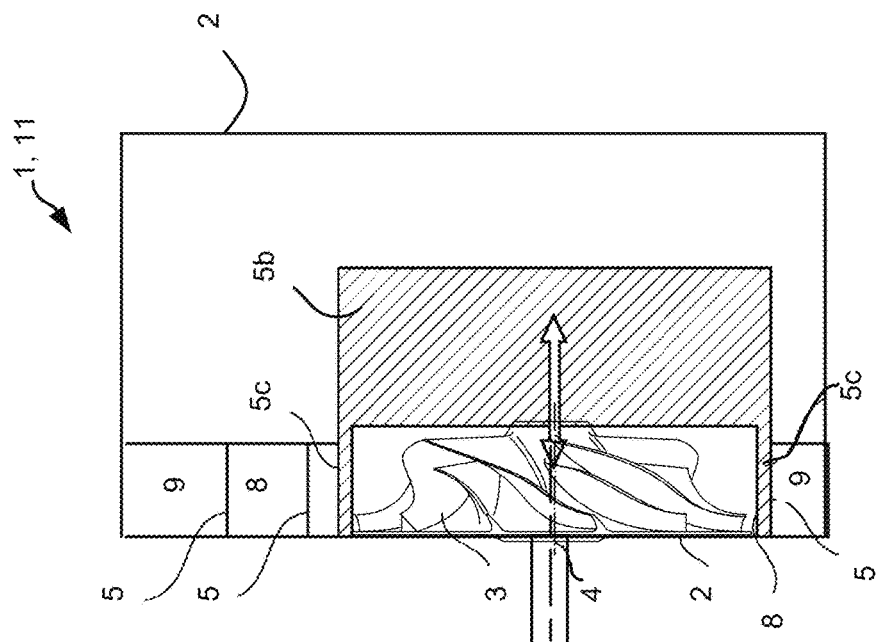
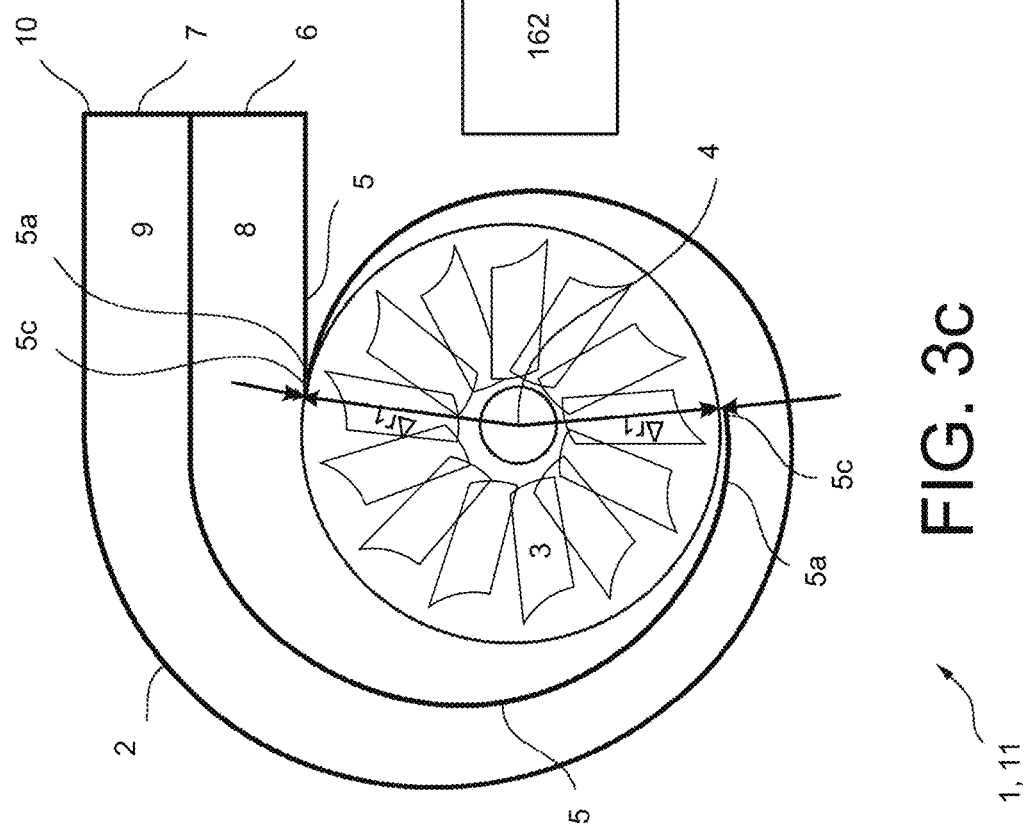

US 10,006,354 B2

SYSTEM AND METHOD FOR VARIABLE TONGUE SPACING IN A MULTI-CHANNEL TURBINE IN A CHARGED INTERNAL COMBUSTION ENGINE

CROSS REFERENCE TO RELATED APPLICATIONS

The present application claims priority to German Patent Application No. 102013213450.9, filed Jul. 9, 2013, the entire contents of which are hereby incorporated by reference for all purposes.

BACKGROUND\SUMMARY

An engine charged with a turbocharger comprising a multi-channel turbine includes a wall which separates the channels to an extent to the rotor to vary the interaction between the two channels. A dual flow turbine is able to separate two flows of two cylinder exhaust groups, which helps to improve low end torque. The efficiency and the separation characteristic of dual flow turbines are influenced by the spacing distance between the tongue of the turbine housing wall and the turbine wheel. The engine may consider different spacing characteristics of the turbine in different operating conditions to increase efficiency.

One approach is to provide a wall which separates the channels from one another to the rotor, at low engine speeds/loads this aids in pulse charging. Another approach is to provide a wall which leaves spacing to the rotor, thereby providing a degree of interaction between the two channels, at high engine speeds/load this aids in constant pressure charging.

A potential issue noted by the inventors with the above approaches is that providing a wall which has a fixed position only enables the engine to be optimized under certain operating conditions.

One potential approach to at least partially address some of the above issues includes a charged internal combustion engine comprising at least one cylinder head with at least two cylinders and at least one exhaust-gas turbocharger with at least one turbine. Each cylinder of the charged internal combustion engine comprises at least one outlet opening for discharging the exhaust gases out of the cylinder with each outlet opening being adjoined by an exhaust line. The at least two cylinders are configured in such a way as to form at least two groups with in each case at least one cylinder. The exhaust lines of the cylinders of each cylinder group merge to form a respective overall exhaust line, thus forming an exhaust manifold with the at least two overall exhaust lines being connected to a multi-channel segmented turbine. The turbine comprises at least one rotor mounted on a rotatable shaft in a turbine housing and the at least two channels of the turbine, when viewed in a section perpendicular to the shaft of the rotor are arranged one on top of the other at least along an arc-shaped section and enclose the at least one rotor in spiral form at different radii and are open toward the at least one rotor in each case along a circular-arc-shaped segment, in such a way that in each case one overall exhaust line is connected to one of the at least two channels of the turbine. In each case, the two adjacent channels are separated from one another, at least in sections and in a continuation of the overall exhaust lines in the turbine housing by means of a housing wall. At the rotor side, the at least one housing wall that separates two adjacent channels has a free tongue-like end and ends with a spacing to the at least one rotor, such that a tongue spacing is formed. Here, the multi-channel segmented turbine is the turbine of the at least one exhaust-gas turbocharger wherein a movable annular support is provided which has at least one tongue-like element and which is displaceable in translational fashion along the rotatable shaft for the purpose of varying the tongue spacing. When the support is in a first working position, the at least one tongue-like element lengthens the free tongue-like end of the housing wall that separates two adjacent channels such that the tongue spacing is reduced to the at least one rotor. When the support is in a rest position, the at least one tongue-like element is positioned laterally adjacent to the at least one rotor.

In this way, a multi-channel turbocharger with adjustable tongue spacing may vary the degree of interaction between the channels via the tongue spacing. Thus, a flow transfer duct may be opened or closed based on engine operating parameters to change the degree of separation of the channels to the rotor and better enable operating at different conditions. For example, at high engine loads and/or speeds, when a large exhaust gas volume may be present in the exhaust manifold, the degree of interaction between the channels may be high by adjusting the annular support to open a flow transfer duct. In another example, at a low engine load, when a small exhaust gas volume is present, the tongue spacing may be lengthened by adjusting the annular support to close a flow transfer duct and increase the degree of separation of the channels.

In another example, a method for operating a charged engine, comprises displacing an annular support with at least one tongue-like element in a translational fashion along a rotatable shaft of a turbine from a rest position to a first working position in order to increase a degree of separation of at least two channels of the turbine by reducing a tongue spacing. In this way, by reducing the tongue spacing, it is possible to decrease the degree of interaction of the two channels to the turbine under engine operating conditions where a difference in exhaust flow in the two channels may exist. Thus, mutual influencing of the pressure pulses of the exhaust flow may be substantially reduced and turbine efficiency increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3a schematically shows the two-channel turbine of a first embodiment of the charged internal combustion engine, sectioned perpendicularly to the axis of rotation of the rotor, and with a support situated in the rest position.

FIG. 3b schematically shows the turbine illustrated in FIG. 3a in a section rotated through 90° with respect to FIG. 3a.

FIG. 3c schematically shows the two-channel turbine of a first embodiment of the charged internal combustion engine, sectioned perpendicularly with respect to the axis of rotation of the rotor, and with the support situated in the first working position.

FIG. 3d schematically shows the turbine illustrated in FIG. 3c in a section rotated through 90° with respect to FIG. 3c.

DETAILED DESCRIPTION

Figure 1:
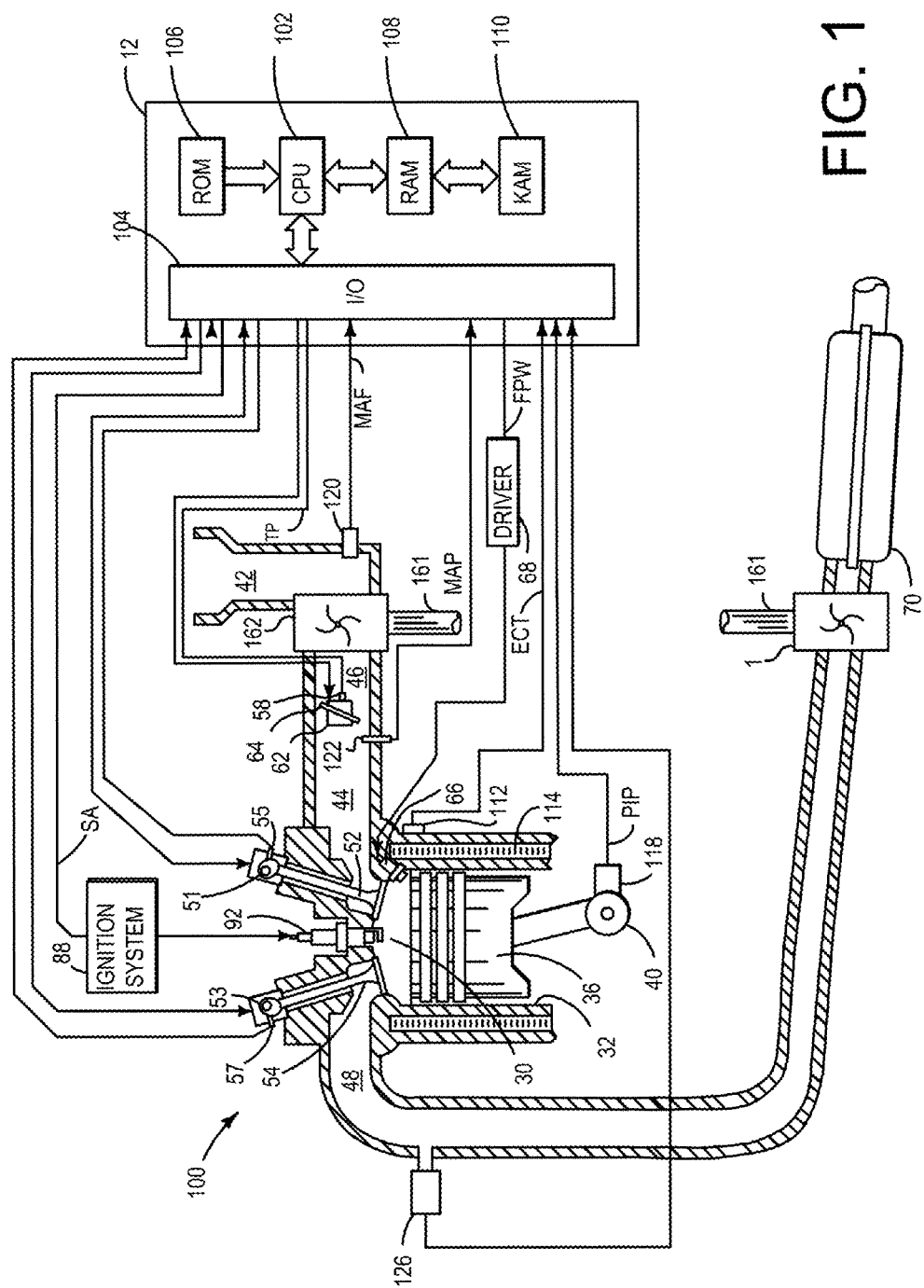
FIG. 1 illustrates an example embodiment of a multi-cylinder charged engine with a turbocharger.

The present application relates to a charged internal combustion engine, for example a supercharged engine, comprising at least one cylinder head with at least two cylinders and having at least one exhaust-gas turbocharger with at least one turbine, wherein each cylinder has at least one outlet opening for discharging the exhaust gases out of the cylinder and each outlet opening is adjoined by an exhaust line. The at least two cylinders are configured in such a way as to form at least two groups with in each case at least one cylinder. The exhaust lines of the cylinders of each cylinder group merge to form a respective overall exhaust line, thus forming an exhaust manifold with the at least two overall exhaust lines being connected to a multi-channel segmented turbine. The turbine comprises at least one rotor mounted on a rotatable shaft in a turbine housing and the at least two channels of the turbine—as viewed in a section perpendicular to the shaft of the rotor—are arranged one on top of the other at least along an arc-shaped section and enclose the at least one rotor in spiral form at different radii and are open toward the at least one rotor in each case along a circular-arc-shaped segment, in such a way that in each case one overall exhaust line is connected to one of the at least two channels of the turbine. The two adjacent channels are separated from one another, at least in sections and in a continuation of the overall exhaust lines in the turbine housing, by means of a housing wall, wherein, at the rotor side, the at least one housing wall that separates two adjacent channels has a free tongue-like end and ends with a spacing to the at least one rotor, such that a tongue spacing is formed. The multi-channel segmented turbine is the turbine of the at least one exhaust-gas turbocharger.

The present application also relates to a method for operating an internal combustion engine of said type.

An internal combustion engine of the type mentioned in the introduction is used as a motor vehicle drive unit. Within the context of the present application, the expression "internal combustion engine" encompasses diesel engines and applied-ignition engines and also hybrid internal combustion engines, which utilize a hybrid combustion process, and hybrid drives which comprise not only the internal combustion engine but also an electric machine which is connected in terms of drive to the internal combustion engine and which receives power from the internal combustion engine or which, as a switchable auxiliary drive, outputs additional power.

Internal combustion engines have a cylinder block and a cylinder head which are connected to one another to form the cylinders. The cylinder head conventionally serves to hold the valve drive. To control the charge exchange, an internal combustion engine requires control elements—generally in the form of valves—and actuating devices for actuating these control elements. The valve actuating mechanism for the movement of the valves, including the valves themselves, is referred to as the valve drive. During the charge exchange, the combustion gases are discharged via the outlet openings of the at least two cylinders, and the charging of the combustion chambers, that is to say the induction of fresh mixture or charge air, takes place via the inlet openings.

In some approaches, the exhaust lines which adjoin the outlet openings are at least partially integrated in the cylinder head and are merged to form a common overall exhaust line or in groups to form two or more overall exhaust lines. The merging of exhaust lines to form an overall exhaust line is referred to generally, and within the context of the present application, as an exhaust manifold.

The way in which the exhaust lines of the cylinders are merged in the specific situation, that is to say the design configuration of the exhaust-gas discharge system, is dependent substantially on the characteristic map areas for which the operating behavior of the internal combustion engine is to be optimized.

In the case of charged internal combustion engines in which at least one turbine of an exhaust-gas turbocharger is provided in the exhaust-gas discharge system and which are intended to exhibit satisfactory operating behavior in the lower engine speed and/or load range, that is to say in the case of relatively low exhaust-gas flow rates, so-called pulse charging, also known as impulse supercharging, is selected.

Here, the dynamic wave phenomena which occur in the exhaust-gas discharge system—in particular during the charge exchange—should be utilized for the purpose of charging and for improving the operating behavior of the internal combustion engine.

The evacuation of the combustion gases out of a cylinder of the internal combustion engine during the charge exchange is based substantially on two different mechanisms. When the outlet valve opens close to bottom dead center at the start of the charge exchange, the combustion gases flow at high speed through the outlet opening into the exhaust-gas discharge system on account of the high pressure level prevailing in the cylinder at the end of the combustion and the associated high pressure difference between the combustion chamber and exhaust line. Said pressure-driven flow process is assisted by a high pressure peak which is also referred to as a pre-outlet shock and which propagates along the exhaust line at the speed of sound, with the pressure being dissipated, that is to say reduced, to a greater or lesser extent with increasing distance traveled as a result of friction.

During the further course of the charge exchange, the pressures in the cylinder and in the exhaust line are equalized, such that the combustion gases are no longer evacuated primarily in a pressure-driven manner but rather are discharged as a result of the reciprocating movement of the piston.

At low engine speeds, the pre-outlet shock may advantageously be utilized for pulse charging, wherein temporally short, high pressure pulses may be utilized for energy utilization in the turbine. In this way, it is possible by means of exhaust-gas charging, for example turbocharging, to generate high charge-pressure ratios, that is to say high charge pressures on the inlet side, even in the case of low exhaust-gas flow rates, in particular at low engine speeds.

Pulse charging has proven to be particularly advantageous for accelerating the turbine rotor, that is to say for increasing the turbine rotational speed, which may fall to a noticeable extent during idle operation of the internal combustion engine or at low load, and which should frequently be increased again with as little delay as possible by means of the exhaust-gas flow in the event of an increased load demand. The inertia of the rotor and the friction in the shaft bearing arrangement generally slow an acceleration of the rotor to higher rotational speeds and therefore hinder an immediate rise in the charge pressure.

To be able to utilize the dynamic wave phenomena occurring in the exhaust-gas discharge system, in particular the pre-outlet shocks, for the pulse charging for improving the operating behavior of the internal combustion engine, the pressure peaks or pre-outlet shocks in the exhaust-gas discharge system must be maintained. It is particularly advantageous if the pressure impulses are intensified in the exhaust lines, but at least do not attenuate one another or cancel one another out.

It is therefore expedient for the cylinders to be grouped, or for the exhaust lines to be merged, in such a manner that the high pressures, in particular the pre-outlet shocks of the individual cylinders, in the exhaust-gas discharge system are maintained, and mutual influencing may be substantially reduced.

The subject matter of the present application also encompasses an internal combustion engine in which the cylinders are grouped. According to the present application, at least two cylinders are configured in such a way as to form at least two groups with in each case at least one cylinder. The exhaust lines of the cylinders of each cylinder group merge to form a respective overall exhaust line, thus forming an exhaust manifold. Here, the cylinders are configured in such a way that the dynamic wave phenomena in the exhaust lines of the cylinders of a group have the least possible adverse effect on one another.

In a cylinder head having four cylinders in an in-line arrangement, it is advantageous in this regard for two cylinders which have an ignition interval of 360° CA to be combined in each case to form a cylinder group. For example, if the ignition in the cylinders is initiated in accordance with the ignition sequence 1-2-4-3 or in accordance with the ignition sequence 1-3-4-2, it is advantageous for the outer cylinders to be combined to form a first group and for the inner cylinders to be combined to form a second group.

Pulse charging however also has disadvantages. For example, the charge exchange is generally impaired as a result of the pressure pulses in the exhaust-gas discharge system. The cylinders of a group may have an interfering, that is to say detrimental effect on one another during the charge exchange. The pressure waves originating from a cylinder run through the at least one exhaust line of said cylinder and also along the exhaust lines of the other cylinders of said group, specifically possibly as far as the outlet opening provided at the end of the respective line. Exhaust gas which has already been expelled or discharged into an exhaust line during the charge exchange may thus pass back into the cylinder again, specifically as a result of the pressure wave originating from another cylinder. In particular, it has proven to be disadvantageous if, toward the end of the charge exchange, positive pressure prevails at the outlet opening of a cylinder or the pressure wave of another cylinder propagates along the exhaust line in the direction of the outlet opening, as this counteracts the evacuation of the combustion gases out of said cylinder. In said phase of the charge exchange, the combustion gases are discharged primarily owing to the reciprocating movement of the piston. In individual situations, it may even be the case that exhaust gas originating from one cylinder passes into another cylinder before the outlet thereof closes. The exhaust gas situated in the cylinder, that is to say the residual gas fraction remaining in the cylinder, has a significant influence on the knocking behavior of an applied-ignition internal combustion engine, wherein the risk of knocking combustion rises with increasing exhaust-gas fraction.

It is also taken into consideration that a turbine is operated most effectively without shocks and without being subjected to fluctuating partial loads. To enable a turbine which is provided downstream of the cylinders in the exhaust-gas discharge system to be operated optimally at relatively high engine speeds, the turbine should be acted on with as constant an exhaust-gas pressure as possible, for which reason a pressure which varies as little as possible is preferable upstream of the turbine rotor in order to realize so-called constant pressure charging, also known as ram supercharging.

By means of a correspondingly large exhaust-gas volume upstream of the rotor, the pressure pulsations in the exhaust lines may be smoothed. In this respect, the grouping of the cylinders, whereby the exhaust lines are combined in groups, resulting in the volume of the exhaust-gas discharge system upstream of the turbine rotor being divided into a plurality of partial volumes, has proven to be counterproductive.

With regard to constant pressure charging, it may be rather advantageous for the exhaust lines of all the cylinders to be merged into a single overall exhaust line in order to make the exhaust-gas volume of the exhaust-gas discharge system upstream of a turbine which is arranged in said overall exhaust line as large as possible, that is to say to maximize said exhaust-gas volume, and to minimize the pressure fluctuations.

There is thus a resulting conflict of aims when configuring the exhaust-gas discharge system for the purpose of optimizing the exhaust-gas discharge system both with regard to low engine speeds and with regard to high engine speeds. Grouping the cylinders in order to realize pulse charging leads to an expedient operating behavior at low engine speeds, but disadvantages must be accepted at relatively high engine speeds. In contrast, if as large an exhaust-gas volume as possible is realized upstream of the turbine in order to be able to utilize the advantages of constant pressure charging, the operating behavior at low engine speeds is impaired.

Concepts are known from some approaches in which the two exhaust manifolds of the two cylinder groups may be connected to and separated from one another. The exhaust-gas discharge system is then configured as a function of the engine speed, such that charging of the engine by pulse charging may be realized by separating the exhaust manifolds and charging of the engine by constant pressure charging may be realized by connecting the exhaust manifolds.

A disadvantage of the concept described above is that, as a result of the connection of the manifolds, a connection is realized close to the outlet openings of the cylinders, whereby the residual gas problem described above, and the associated knocking problem, is abetted.

Concepts are likewise known in which the channels of the multi-channel turbine may be connected to one another and separated from one another in the turbine housing, wherein the channels are connected to one another and separated from one another as a function of engine speed in order for the internal combustion engine to be operated, and charged, by means of pulse charging and constant pressure charging respectively.

Aside from the strict separation and complete connection of the manifolds or of the channels, concepts or turbines may also be of interest in which the degree of interaction between the channels of the turbine, and thus the separation behavior of the turbine channels, may be influenced.

It may then be possible, over virtually the entire characteristic map of the internal combustion engine, for the turbine to be adapted to an extremely wide variety of operating points or operating conditions in order to better enable operation of the internal combustion engine with the greatest possible level of optimization with regard to fuel consumption and with the lowest possible emissions.

Against the background of that stated above, it is an object of the present application to provide a charged, e.g. supercharged, internal combustion engine as per the preamble of claim 1, in which the degree of interaction between the channels of the turbine, and the separation behavior of the channels, that is to say the degree of separation, may be influenced.

It is a further sub-object of the present application to specify a method for operating an internal combustion engine of said type.

The first sub-object is achieved by means of a charged internal combustion engine having at least one cylinder head with at least two cylinders and having at least one exhaust-gas turbocharger with at least one turbine. Each cylinder has at least one outlet opening for discharging the exhaust gases out of the cylinder, and each outlet opening is adjoined by an exhaust line with the at least two cylinders configured in such a way as to form at least two groups with in each case at least one cylinder. The exhaust lines of the cylinders of each cylinder group merge to form a respective overall exhaust line, thus forming an exhaust manifold. The at least two overall exhaust lines are connected to a multi-channel segmented turbine, which comprises at least one rotor mounted on a rotatable shaft in a turbine housing and the at least two channels of which—as viewed in a section perpendicular to the shaft of the rotor—are arranged one on top of the other at least along an arc-shaped section and enclose the at least one rotor in spiral form at different radii and are open toward the at least one rotor in each case along a circular-arc-shaped segment, in such a way that in each case one overall exhaust line is connected to one of the at least two channels of the turbine with in each case two adjacent channels are separated from one another, at least in sections and in a continuation of the overall exhaust lines in the turbine housing, by means of a housing wall, wherein, at the rotor side, the at least one housing wall that separates two adjacent channels has a free tongue-like end and ends with a spacing to the at least one rotor, such that a tongue spacing is formed. The multi-channel segmented turbine is the turbine of the at least one exhaust-gas turbocharger and wherein a movable annular support is provided which has at least one tongue-like element and which is displaceable in translational fashion along the rotatable shaft for the purpose of varying the tongue spacing, wherein, when the support is in a first working position the at least one tongue-like element lengthens the free tongue-like end of a housing wall that separates two adjacent channels, such that the tongue spacing is reduced, and when the support is in a rest position, the at least one tongue-like element is positioned laterally adjacent to the at least one rotor.

In the internal combustion engine according to the present application, two adjacent channels of the turbine are connected or connectable to one another at their rotor-side end by means of a flow transfer duct, wherein the flow cross section of the flow transfer duct and thus the degree of interaction between the channels may be influenced through a variation of the tongue spacing. Here, the tongue spacing is defined as the spacing between the free tongue-like end of the housing wall, which separates the adjacent channels from one another, and the at least one rotor, or as the spacing between the end of a tongue-like element of an annular support, which, at least when the support is in a first working position, lengthens the free tongue-like end of a housing wall that separates two adjacent channels, and the at least one rotor.

The present application is focused on the interaction between the channels or on the influencing of said interaction and the variation of the degree of said interaction, and not on the transition from constant pressure charging to pulse charging or vice versa.

The first object on which the present application is based is thus achieved, that is to say a charged internal combustion engine as per the preamble of claim 1 is provided in which the degree of interaction between the channels of the turbine may be influenced.

Nevertheless, embodiments may be realized in which, when the annular support is in the first working position, adjacent channels of the turbine and thus the exhaust systems of the associated cylinder groups are separated from one another, such that each channel communicates only with the exhaust lines of that cylinder group from which it is originally fed. This assists pulse charging utilizing the pressure peaks propagating into the exhaust manifolds. When the support is in the rest position, an exchange of exhaust gas may then be possible between the adjacent channels via the flow transfer duct. It may be possible for the pressure fluctuations in the channels of the turbine to be smoothed, or for the pressures in the channels upstream of the rotor to be aligned, as a function of the degree of interaction between the channels. A specific objective could be specified for the individual situation.

Multi-channel turbines are suitable for charged internal combustion engines in which the exhaust lines of the cylinders are merged in groups, in order to realize channel separation and in order to reduce interaction between the channels, but also for internal combustion engines with partial deactivation capability, in which one cylinder group is configured as a switchable cylinder group and in which, if appropriate, the channel of a deactivated cylinder group should likewise be able to be deactivated, that is to say closed off.

The turbine may fundamentally be fitted with a variable turbine geometry which may be adapted by adjustment to the respective operating point of the internal combustion engine.

In the internal combustion engine according to the present application, the exhaust lines of at least two cylinders are merged to form at least two overall exhaust lines, thus forming at least two exhaust manifolds. In this respect, embodiments having three, four, five or more cylinders, wherein the exhaust lines of more than two cylinders are merged to form two or more overall exhaust lines, are likewise internal combustion engines according to the present application, wherein then, use could be made of a three-channel, four-channel or five-channel turbine.

Further advantageous embodiments of the internal combustion engine according to the present application will be explained in conjunction with the subclaims.

Embodiments of the charged internal combustion engine are advantageous in which the support is adjustable in two-stage fashion and is situated either in the first working position or in the rest position.

The control of the support is simplified if the support is configured so as to be switchable in two-stage fashion such that either a housing wall that separates two adjacent channels is lengthened at its free tongue-like end by the at least one tongue-like element or else said at least one tongue-like element is positioned laterally adjacent to the at least one rotor. This offers cost advantages in particular.

The support may however also be switchable in continuously variable fashion such that the at least one tongue-like element lengthens the housing wall along a section of the free tongue-like end thereof, and a remaining section is not lengthened, that is to say remains non-lengthened, and maintains its original extent. The number of degrees of freedom for influencing the interaction between the channels of the turbine is increased considerably.

Embodiments of the charged internal combustion engine are therefore also advantageous in which the support is adjustable in continuously variable fashion between the first working position and the rest position. That is to say that all positions between the first working position and the rest position constitute further working positions.

Embodiments are advantageous in which the support may be electrically, hydraulically, pneumatically, mechanically or magnetically controlled, preferably by means of the engine controller of the internal combustion engine.

Embodiments of the charged internal combustion engine are advantageous in which the at least one tongue-like element is formed integrally with the support, and the support and the at least one tongue-like element form a monolithic component.

A connection is provided, that is to say produced, between the support and the at least one tongue-like element. Said connection may be realized either by virtue of the two components being manufactured in one piece, that is to say integrally, as per the embodiment above, or alternatively by means of a cohesive, non-positively locking or positively locking connection of the two components.

The embodiment as a monolithic component eliminates the need for connecting means such as screws, rivets or the like for forming a connection. The design requirement for providing installation space for the connecting means is thus also omitted.

Furthermore, the number of components is reduced significantly if the support and the at least one tongue-like element are formed as a monolithic component. Owing to the fact that fewer components have to be manufactured and connected, less assembly and/or production errors occur. This has an advantageous effect on functionality and on service life.

As already mentioned above, however, embodiments of the charged internal combustion engine may also be advantageous in which the support and the at least one tongue-like element constitute separate components that are connected to one another.

Embodiments of the charged internal combustion engine are advantageous in which the multi-channel segmented turbine is a dual-flow turbine with two channels.

In the case of a dual-flow turbine, two channels are arranged one on top of the other as viewed in a section perpendicular to the axis of rotation of the at least one rotor, wherein the two channels enclose the at least one rotor in spiral form at different radii at least along an arc-shaped section.

In the case of a dual-flow turbine, embodiments of the charged internal combustion engine are advantageous in which the two channels are open toward the at least one rotor in each case along a circular-arc-shaped segment of 180°. Then, the two channels supply exhaust gas to the at least one rotor over equal-sized circular arcs along the rotor circumference.

In conjunction with a dual-flow turbine, embodiments of the charged internal combustion engine are advantageous in which the support has two tongue-like elements which, when the support is in the first working position, each lengthen the free tongue-like end of one of a total of two housing walls that separate the two adjacent channels from one another.

In the case of a dual-flow turbine, the two channels situated one on top of the other are separated from one another by a housing wall running in the interior of the turbine housing, wherein the housing wall that delimits the housing to the outside commonly separates the channels in the inlet region of the turbine, that is likewise constitutes a housing wall that separates two adjacent channels from one another. It is then necessary to provide two tongue-like elements in order for the two housing walls to be lengthened when the support is in the first working position.

In this connection, embodiments of the charged internal combustion engine may however also be advantageous in which the support has one tongue-like element which, when the support is in the first working position, lengthens the free tongue-like end of one housing wall that separates the two adjacent channels from one another. In individual cases, the housing wall that delimits the housing to the outside does not serve to separate the channels, such that the housing wall running in the interior of the turbine housing constitutes the only housing wall that separates two adjacent channels from one another.

Embodiments of the charged internal combustion engine in which the support has the same number of tongue-like elements as the turbine comprises channels, or embodiments in which the support has one tongue-like element fewer than the turbine comprises channels, are basically advantageous.

Embodiments of the charged internal combustion engine are advantageous in which the at least one housing wall is an immovable wall that is fixedly connected to the housing. Said embodiment of the housing wall better enables that the heat introduced into the housing wall by the hot exhaust gas is discharged into and via the housing in an advantageous manner and to an adequate extent.

Embodiments of the charged internal combustion engine are advantageous in which the exhaust lines of the cylinders of each cylinder group merge to form a respective overall exhaust line, thus forming an exhaust manifold, within the cylinder head.

The multi-channel turbine provided in the exhaust-gas discharge system may then be arranged very close to the outlet of the internal combustion engine, which is to say close to the outlet openings of the cylinders. This has several advantages, in particular because the exhaust lines between the cylinders and the turbine are shortened.

Not only is the path for the hot exhaust gases to the turbine shortened, but both the volume of the individual exhaust manifolds and the volume of the exhaust-gas discharge system downstream of the turbine are also reduced. The thermal inertia of the exhaust-gas discharge system is likewise reduced as a result of the reduction of the mass and the length of the exhaust lines in question.

In this way, the exhaust-gas enthalpy of the hot exhaust gases, which is determined significantly by the exhaust-gas pressure and the exhaust-gas temperature, may be utilized optimally, and a fast response behavior of the turbine better enabled.

The proposed measure also results in a compact design of the cylinder head and thus of the internal combustion engine according to the present application, and permits dense packaging of the drive unit as a whole.

The shortening of the line lengths and the associated reduction in size of the exhaust-gas volume upstream of the rotor improves the response behavior of the turbine and assists the pulse charging in the low load and engine speed range.

The second sub-object on which the present application is based, specifically that of specifying a method for operating a charged internal combustion engine of a type described above, is achieved by means of a method in which the support is transferred into the first working position in order to increase the degree of separation of the at least two channels by reducing the tongue spacing.

That which has been stated in connection with the internal combustion engine according to the present application likewise applies to the method according to the present application.

Method variants are advantageous in which the support is transferred into the first working position in order to assist pulse charging.

Method variants are advantageous in which the displacement of the support is performed in characteristic-map-controlled fashion.

Method variants are advantageous in which the support is transferred into the rest position toward high loads and/or toward high engine speeds.

Figure 4B:
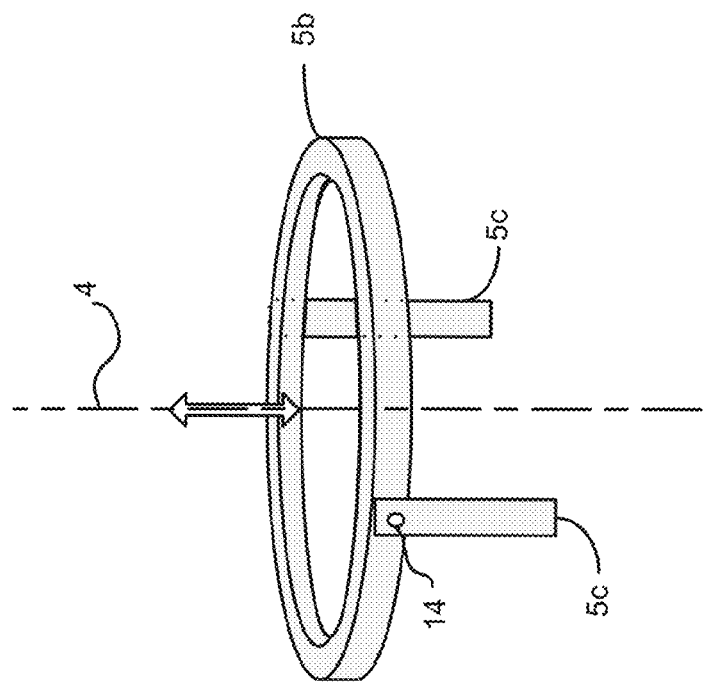
FIG. 4b schematically shows the annular support as a multi-piece construction.
Figure 4A:
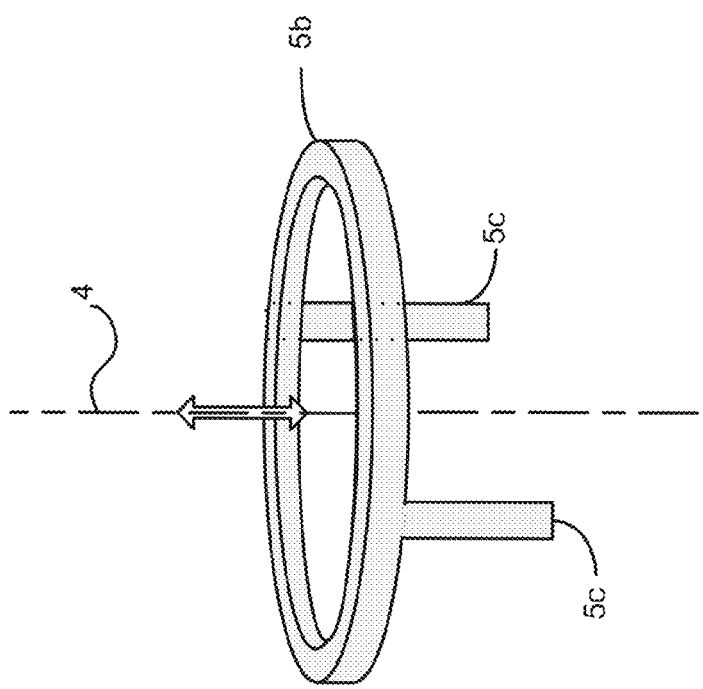
FIG. 4a schematically shows the annular support as a one piece construction.

An example engine with a turbocharger for charging is illustrated in FIG. 1. An example turbocharger is shown in more detail in FIGS. 2, 3a, 3b, 3c, and 3d, such that the support affecting the aerodynamic flow through the turbine may be examined. An example support is shown in FIGS. 4a and 4b. An example method is outlined in FIG. 5 for adjusting the support in response to an engine speed and load. With this turbocharger configuration, it may be possible to extend the operating range of the turbocharger.

FIG. 1 shows an example of a multi-cylinder engine 100 with a turbocharger. As a non-limiting example, engine system 100 can be included as part of a propulsion system for a passenger vehicle. Internal combustion engine 100 may comprise a plurality of cylinders, one cylinder of which is shown and is controlled by controller 12. Engine 100 includes combustion chamber 30 with cylinder walls 32 and piston 36 positioned within and connected to crankshaft 40. Controller 12 is shown as a microcomputer including microprocessor unit CPU 102, input/output ports I/O 104, an electronic storage medium for executable programs and calibration values shown only as read only memory chip ROM 106 in this particulate example, random access memory RAM 108 and keep alive memory KAM 110.

Controller 12 receives various signals from sensors coupled to engine 100, including but not limited to: measurements of inducted mass air flow (MAF) from mass air flow sensor 120; engine coolant temperature (ECT) from temperature sensor 112 coupled to cooling sleeve 114; a measurement of manifold pressure (MAP) from manifold pressure sensor 122; throttle position (TP) from a throttle position sensor 58; and a profile ignition pick up signal (PIP) from Hall effect sensor 118 coupled to crankshaft 40 indicating an engine speed. Engine speed signal, RPM, may be generated by controller 12 from PIP signal. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa.

Storage medium read-only memory chip 106 can be programmed with computer readable data representing instructions executable by processor 102 for performing the methods described below as well as other variants that are anticipated but not specifically listed. The controller 12 may receive input data from the various sensors, process the input data, and trigger the actuators in response to the processed input data based on instruction or code programmed therein corresponding to one or more routines. An example control routine is described herein with regard to FIG. 4.

Combustion chamber 30 communicates with intake manifold 44 and exhaust manifold 48 via respective intake valve 52 and exhaust valve 54. In the depicted example, the intake valve 52 is operated by an intake cam 51 and the exhaust valve 54 is operated by an exhaust cam 53. The position of intake valve 52 and exhaust valve 54 may be determined by valve position sensors 55 and 57, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Each cylinder 30 of engine 100 may include a spark plug 92 for initiating combustion. Ignition system 88 can provide an ignition spark to combustion chamber 30 via spark plug 92 in response to spark advance signal SA from controller 12, under select operating modes. However, in some embodiments, spark plug 92 may be omitted, such as where engine 100 may initiate combustion by auto-ignition or by injection of fuel, as may be the case with some diesel engines.

Each cylinder of engine 100 may be configured with one or more fuel injectors for providing fuel thereto. As a non-limiting example, cylinder 30 is shown including one fuel injector 66. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection of fuel into combustion chamber 30. In FIG. 1, the fuel injector 66 is illustrated as a side injector, however, it may be located overhead of the piston, such as near the position of spark plug 92. Alternatively, the injector may be located overhead and near the intake valve to improve mixing. In an alternate embodiment, injector 66 may be a port injector providing fuel into the intake port upstream of cylinder 30. In yet another embodiment, a port injector and a direct injector may be provided. Fuel may be delivered to fuel injector 66 from a fuel system (not shown) including fuel tanks, fuel pumps, and a fuel rail.

Cylinder 30 may receive intake air via a series of intake passages 42, 46, and 44. Intake air passage 44 can communicate with other cylinders of engine 100 in addition to cylinder 30. A throttle 62, including a throttle plate 64, may be provided along an intake passage of the engine for varying the flow rate and/or the pressure of intake air provided to the engine cylinders. For example, throttle 62 may be disposed downstream of compressor 162 as shown in FIG. 1, or be provided upstream of compressor 162.

Exhaust passage 48 can receive exhaust gases from other cylinders of engine 100 in addition to cylinder 30. Exhaust gas sensor 126 is shown coupled to exhaust passage 48 upstream of emission control device 70 and turbine 1. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 may be a three-way catalyst (TWC), NOx trap, various other emission control devices or combinations thereof.

FIG. 1 shows engine 100 configured with a turbocharger including a compressor 162 arranged between intake passages 42 and 46, and an exhaust turbine 1 arranged along exhaust passage 48. Compressor 162 may be at least partially powered by exhaust turbine 1 via shaft 161. The fresh air supplied to the cylinders of the engine 100 is compressed in the compressor 162, which is driven by the turbine 1. The turbine 1 is a multi-channel turbine and is further elaborated in FIGS. 2-3.

Figure 2:
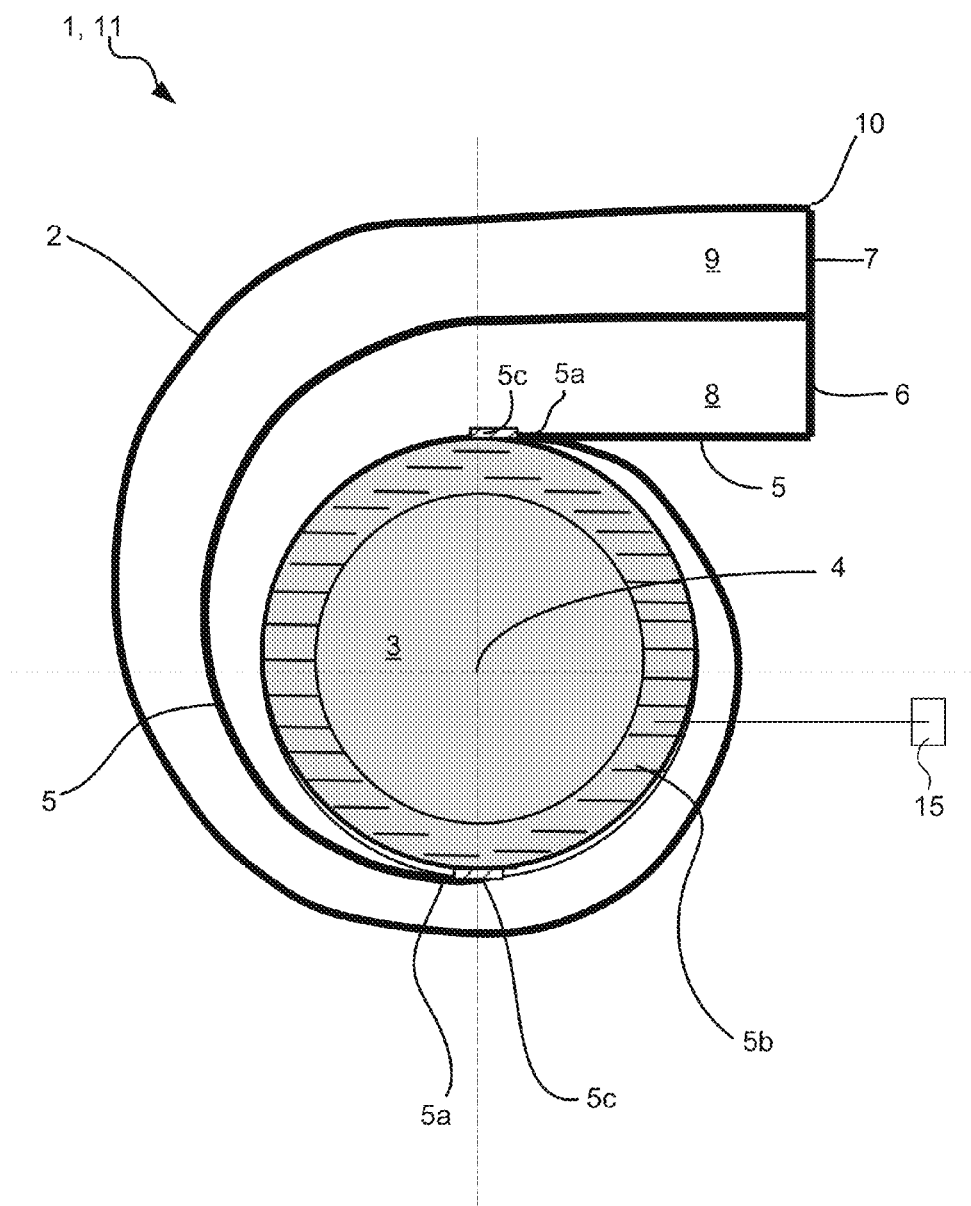
FIG. 2 schematically shows the two-channel turbine of a first embodiment of the charged internal combustion engine sectioned perpendicularly to the axis of rotation with an annular support.

FIG. 2 schematically shows a two-channel turbine 1, sectioned perpendicularly to the axis of rotation 4 of the rotor 3 with an annular support 5b. The two-channel turbine 1 is a two-channel segmented turbine 11, also referred to as a dual-flow turbine 11. The dual-flow turbine 11 has a turbine housing 2 in which a rotor 3 is mounted on a rotatable shaft 161. The dual-flow turbine 11 is characterized by the fact that the two channels 8, 9 are arranged one on top of the other, enclose the rotor 3 in spiral form at different radii at least along an arc-shaped segment, and are open toward the rotor 3 in each case along a circular-arc-shaped segment. The two inlet openings 6, 7 of the dual-flow turbine 11 are arranged in a flange 10 of the housing 2, wherein each inlet opening 6, 7 are adjoined by one channel 8, 9 of the turbine 1. Each channel 8, 9 of the turbine 1 is connected to one overall exhaust line of the internal combustion engine (not illustrated). The two adjacent channels 8, 9 are separated from one another, in a continuation of the overall exhaust lines in the turbine housing 2, by means of a housing wall 5, wherein, at the rotor side, the housing wall 5 has a free tongue-like end 5a. In addition to said housing wall 5 that runs in the interior of the turbine housing 2, the turbine 1 has a further housing wall 16 that separates the channels 8, 9 from one another in the inlet region of the turbine 1 and which, at the rotor side, likewise has a free tongue-like end 5a.

The annular support 5b has at least one tongue-like element 5c; the support 5b shown in FIG. 2 comprises two tongue-like elements 5c. The support 5b is situated laterally adjacent to the rotor 3 and is displaceable in a translational fashion along the rotatable shaft 161. The displacement of the support 5b between a first working position and rest position, which are elaborated in FIG. 3, brings the tongue-like elements to be abutted to the free tongue-like end 5a or to be hidden in the housing. Thus, the displacement of the support 5b influences the degree of separation behavior of the turbine channels by varying a tongue spacing. A switch 15 is provided which displaces the support 5b in a translational fashion. The switch 15 may be electrical, hydraulic, pneumatic, mechanic, etc. and be controlled by controller 12.

The free tongue-like end 5a is in a fixed position as it is formed at the end of the housing wall 5. There are two free tongue-like ends 5a in the dual flow turbine, as shown. In other examples, turbines with more or fewer channels may have more or less free tongue-like ends. The annular support 5b includes tongue-like elements 5c which are capable of being brought into alignment with the free tongue-like ends 5a of the housing wall 5. In the rest position, the tongue-like elements are withdrawn into the turbine housing 2 by displacing the annular support in translational fashion along the axis of rotation. Thus, the two channels have a degree of interaction when the annular support 5b is in the rest position. In the first working position, the tongue-like elements 5c are brought into alignment with the free tongue-like ends 5a thereby lengthening the free tongue-like end of the housing wall. Thus, the two channels have a lower degree of interaction in comparison to the rest position.

FIG. 3a schematically shows the two-channel turbine 1 of a first embodiment of the charged internal combustion engine, sectioned perpendicularly to the axis of rotation 4 of the rotor 3, and with a support 5b situated in the rest position. The turbine 1 is a dual-flow turbine 11 as described in FIG. 2.

The two adjacent channels 8, 9 are separated from one another, in a continuation of the overall exhaust lines in the turbine housing 2, by means of a housing wall 5, wherein, at the rotor side, the housing wall 5 has a free tongue-like end 5a and ends with a spacing to the rotor 3, such that a tongue spacing $\Delta r$ is formed, with the result that a flow transfer duct is formed between the channels 8, 9.

In the rest position illustrated in FIG. 3a, the support 5b is situated laterally adjacent to the rotor 3. This is shown in FIG. 3b, which schematically shows the turbine 1 illustrated in FIG. 3a in a section rotated through 90° with respect to FIG. 3a. The shaft 161 connects the turbine 1 the compressor 162 of the turbocharger along the axis 4.

The support 5b is annular, has two tongue-like elements 5c and, for the purpose of varying the tongue spacing $\Delta r$, is displaceable in translational fashion (double arrow) along the rotatable shaft 161. In the rest position illustrated, the two tongue-like elements 5c, like the support 5a itself, are also positioned laterally adjacent to the rotor 3. The rest position of the annular support 5b results in the flow transfer duct at the free tongue-like end 5a of the housing wall 5 being open.

In the rest position, the support 5b and the tongue-like elements 5c are positioned such that they are within the housing. Thus, the free tongue-like end 5a has a tongue spacing $\Delta r$, which is larger than the first working position tongue spacing $\Delta r1$, illustrated in FIG. 3c. The rest position decreases the degree of separation behavior of the turbine channels with respect to the first working position, which is illustrated further in FIGS. 3c and 3d. The support in the rest position increases the degree of interaction between the turbine channels. Put another way, the rest position opens a flow transfer duct.

FIGS. 3c and 3d schematically show the turbine 1 illustrated in FIG. 3a, with the support 5b in the first working position, wherein FIG. 3c shows a section perpendicular to the axis of rotation 4 of the rotor 3, and FIG. 3d shows a section rotated through 90° with respect to FIG. 3c.

It is sought to explain only the differences in relation to FIGS. 3a and 3b, for which reason reference is otherwise made to FIGS. 3a and 3b and the associated description. The same reference symbols have been used for the same components.

The support 5b that has been transferred into the first working position by translational displacement for the purpose of varying the tongue spacing, lengthen(s) the two housing walls 5 at the free tongue-like end that separate the channels 8, 9 from one another, whereby the tongue spacing $\Delta r1$ is reduced in each case. It is sought for the support 5b to be integrated in as gas-tight a manner as possible when in the first working position. The first working position increases the degree of separation behavior of the turbine channels by lengthening the free tongue-like end 5a by abutting the tongue-like element 5c against the free tongue-like end 5a of the housing wall 5. The degree of interaction of the two channels is decreased and the flow transfer duct, which is open when the support 5b is in the rest position, is now closed in the first working position.

The illustrated dual-flow turbine 11 has two housing walls 5 which separate the two channels 8, 9 and which may be lengthened, specifically a housing wall 5 that runs in the interior of the turbine housing 2, and the housing wall 5 which delimits the housing 2 to the outside and which separates the channels 8, 9 from one another in the inlet region of the turbine 1. In this respect, the support 5b has two tongue-like elements 5c in order to lengthen the two housing walls 5 at their free tongue-like ends 5a when the support 5b is in the first working position.

FIGS. 4a and 4b illustrate the annular support 5b with at least one tongue-like element 5c. In this example, two tongue-like elements 5c are illustrated. In another example, the annular support 5b may have one tongue-like element. In yet another example, the annular support 5b may have as many tongue-like elements 5c as there are channels in the turbine. The annular support 5b is a ring shape and moves in a translational fashion (double arrow) along the axis of rotation 4. The annular support 5b and tongue-like elements 5c may be constructed in one piece, as illustrated in FIG. 4a, or as a multi-piece construction, as illustrated in FIG. 4b.

The one piece construction, shown in FIG. 4a, may be realized by forming all of the parts integrally. This eliminates the need for any connecting means such as screws, rivets, welds, etc. for forming a connection between the annular support 5b and the tongue-like elements 5c.

In contrast, the multi-piece construction, shown in FIG. 4b, may be realized by forming the parts in two or more pieces and then joining the pieces together via connecting means 14. The connecting means 14 may include screws, rivets, welds, etc. for forming a connection between the annular support 5b and the tongue-like elements 5c.

Figure 5:
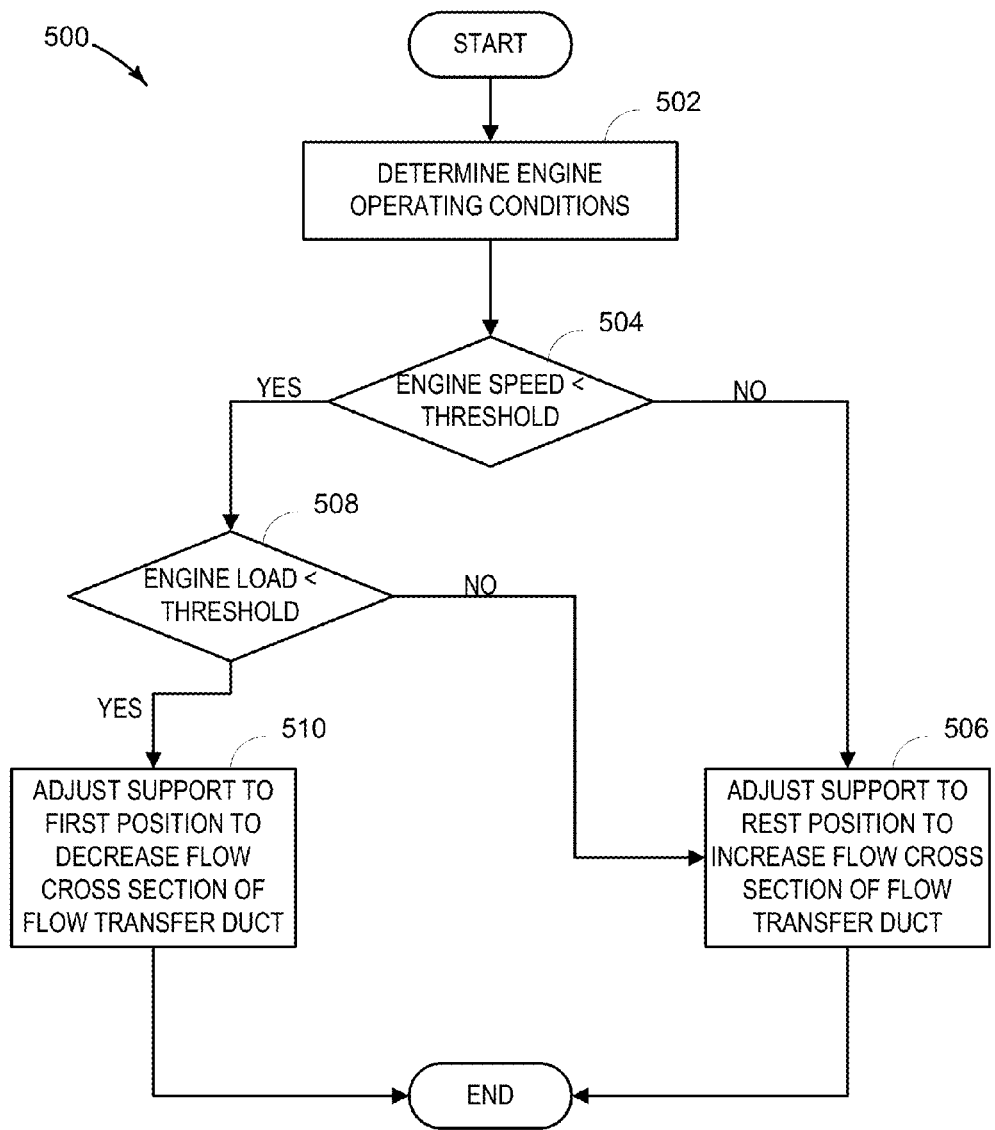
FIG. 5 illustrates an example method for transferring the annular support in response to engine speed and load.

FIG. 5 illustrates an example method for adjusting an annular support to influence to degree of interaction between the channels of the turbine, and thus the separation behavior of the turbine channels. Example method 500 adjusts the annular support in response to engine speed and engine load over a threshold to either open or close a flow transfer duct. This example method shows how the annular support described in FIGS. 2 and 3 may be used to extend the operating range of the turbocharger. In another example, the annular support may be adjusted in response to the exhaust flow rate.

At 502, the method may determine the engine operating conditions. This may include engine speed, engine load, engine temperature, exhaust flow rate, etc.

At 504, the method may determine if the engine speed is below a threshold. At engine speeds greater than this threshold, better enabling a constant exhaust-gas pressure to act on the turbine may increase engine efficiency. Therefore, if the engine speed is not below the threshold, the method may adjust the support to the rest position to increase the flow cross section of the flow transfer duct at 506 by displacing the support such that the tongue-like ends are hidden in the housing. Here, the tongue spacing is based on the fixed free tongue-like end of the housing wall, e.g. the distance to the rotor from the free tongue-like end as shown in FIG. 3a. Thus, the degree of interaction between the two turbine channels is increased when the tongue-like element of the annular support is moved into the housing to open the flow transfer duct.

However, if the engine speed is lower than the threshold at 504, the method may proceed to 508 and determine if the engine load is less than a threshold. In one example, the load threshold may be set based on the engine speed. At high engine loads, increasing the degree of interaction between the turbine channels may increase engine efficiency. If the engine load is not less than the threshold at 508, the method may adjust the support to the rest position at 506 as described above. Thus, a degree of separation between the two channels is decreased when the tongue-like element(s) of the support is hidden in the housing.

If the engine load is less than the threshold at 508, the method may adjust the support to the first position to decrease the flow cross section of the flow transfer duct at 510. Adjusting the annular support to the first position brings the tongue-like ends to abut with the free tongue-like ends by displacing the annular support in a translational manner along the rotatable axis from the rest position to the first working position. The support in the first working position lengthens the free tongue-like end of the housing wall that separates two adjacent channels by bringing the tongue-like element 5c into a position where it abuts against the free tongue-like end, thereby lengthening the free tongue-like end of the housing wall and decreasing the tongue spacing to the at least one rotor, e.g. the distance to the rotor from the free tongue-like end as shown in FIG. 3c. The translational movement of the support along the axis of rotation from the rest position to the first working position brings the tongue-like element from a position within the housing into contact with the free tongue-like end, thereby lengthening the free tongue-like end and reducing the tongue spacing to the rotor. Moving the tongue-like element of the annular support into an exhaust flow at the free tongue-like end of the housing wall reduces the tongue spacing to the rotor in the first working position.

Method 500 illustrated an example to adjust an annular support in a two-stage fashion in response to engine speed and load. In other examples, other operating parameters may be used to determine adjustment of the annular support. Further, the annular support may be adjusted in a continuously variable fashion, allowing for greater control over the degree of separation of the two channels by reducing a tongue spacing in a targeted manner.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a charged engine, comprising: determining engine operating conditions, and
when conditions are below a threshold, displacing an annular support in a translational fashion along a rotatable shaft of a turbine from a rest position to a first working position, wherein in the first working position at least one tongue element of the support abuts against and lengthens a free tongue-like end of a turbine housing wall that separates two adjacent channels of the turbine from one another.

2. The method as claimed in claim 1, wherein the support is transferred into the first working position in response to an engine speed less than a threshold speed, and wherein the support is transferred into the rest position in response to an engine speed greater than the threshold speed.

3. The method as claimed in claim 2, further comprising transferring the support into the first working position in response to an engine load less than a threshold load, and transferring the support into the rest position in response to an engine load greater than the threshold load.

4. The method as claimed in claim 1, wherein in the rest position of the support, a flow transfer duct at the free tongue-like end of the housing wall is open and the two adjacent channels are connected via the flow transfer duct, and wherein in the first working position of the support, the flow transfer duct is closed and the two adjacent channels are separated from one another such that each channel communicates only with exhaust lines of an engine cylinder group from which each channel is fed.

5. The method as claimed in claim 1, wherein in the rest position of the support, the at least one tongue element is positioned laterally adjacent to a rotor of the turbine.

6. A method for adjusting a charger, comprising:
responsive to an engine speed less than a threshold, closing a flow transfer duct at a free tongue-like end of a housing wall of a turbine by moving a tongue-like element of an annular support into an exhaust flow to abut against the free tongue-like end of the housing wall; and
responsive to an engine speed greater than the threshold, adjusting the annular support to open the flow transfer duct.

7. The method of claim 6, wherein the annular support is adjusted in a continuously variable fashion via an electronic engine controller coupled to an engine.

8. The method of claim 6, wherein adjusting the annular support to open the flow transfer duct includes moving the tongue-like element of the annular support into a housing of the turbine, the housing including the housing wall, wherein the tongue-like dement is positioned laterally adjacent to a rotor of the turbine.

9. The method of claim 6, wherein the annular support is adjusted in a translational fashion along the turbine's axis of rotation.

10. The method of claim 6, wherein the housing wall separates two adjacent channels of the turbine from one another, wherein when the flow transfer duct is open the two adjacent channels are connected via the flow transfer duct, and wherein when the flow transfer duct is closed the two adjacent channels are separated from one another such that each channel communicates only with exhaust lines of an engine cylinder group from which each channel is fed.

* * * * *